(12) United States Patent
Hurwic

(10) Patent No.: US 7,464,795 B2
(45) Date of Patent: Dec. 16, 2008

(54) METHOD AND DEVICE FOR MONITORING THE APPLICATION OF A MOTOR VEHICLE AUTOMATIC PARKING BRAKE

(75) Inventor: Aleksander Hurwic, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 10/580,657

(22) PCT Filed: Dec. 13, 2004

(86) PCT No.: PCT/FR2004/003271

§ 371 (c)(1),
(2), (4) Date: May 26, 2006

(87) PCT Pub. No.: WO2005/058661

PCT Pub. Date: Jun. 30, 2005

(65) Prior Publication Data

US 2007/0158142 A1    Jul. 12, 2007

(30) Foreign Application Priority Data

Dec. 17, 2003  (FR) .................................. 03 14798

(51) Int. Cl.
*F16D 63/00* (2006.01)
(52) U.S. Cl. .............................. 188/1.11 E; 188/1.11 L
(58) Field of Classification Search ............. 188/1.11 E, 188/1.1 L, 251 M
See application file for complete search history.

(56) References Cited

U.S. PATENT DOCUMENTS

| | | | | |
|---|---|---|---|---|
| 3,958,445 A * | 5/1976 | Howard et al. | ..................... | 73/7 |
| 4,415,363 A * | 11/1983 | Sanftleben et al. | ............ | 75/229 |
| 4,508,196 A * | 4/1985 | Jamon | ..................... | 188/1.11 L |
| 4,591,213 A * | 5/1986 | Rapoport | ..................... | 303/191 |
| 4,602,702 A * | 7/1986 | Ohta et al. | .................. | 188/72.1 |
| 5,090,518 A * | 2/1992 | Schenk et al. | ............... | 188/72.1 |
| 5,203,438 A * | 4/1993 | Ide | .......................... | 192/107 C |
| 5,339,931 A * | 8/1994 | Jacko et al. | .............. | 188/251 M |
| 5,860,494 A * | 1/1999 | Nishizawa et al. | ........ | 188/73.35 |
| 6,536,562 B1 * | 3/2003 | Bohm et al. | ................. | 188/156 |
| 6,585,089 B1 * | 7/2003 | Parker | .................. | 188/218 XL |
| 6,748,310 B2 * | 6/2004 | Tamasho et al. | .............. | 701/70 |
| 7,104,364 B2 * | 9/2006 | Godlewsky et al. | ..... | 188/1.11 L |

* cited by examiner

*Primary Examiner*—Christopher P Schwartz
(74) *Attorney, Agent, or Firm*—Leo H McCormick, Jr.; Sarah Taylor

(57) ABSTRACT

A device and method for monitoring the application of a motor vehicle automatic parking brake by measuring a physical property (either resistivity or electrical conductivity) of a friction lining (3) of a brake pad (2) throgh a measurement apparatus (5) electrically connected to the friction lining and comparing the values measured during and after the application of the automatic parking brake with values prerecorded in memory to identify the position of the parking brake.

6 Claims, 2 Drawing Sheets

METHOD AND DEVICE FOR MONITORING THE APPLICATION OF A MOTOR VEHICLE AUTOMATIC PARKING BRAKE

The invention relates to a device and a method for monitoring the application of a motor vehicle automatic parking brake.

BACKGROUND OF THE INVENTION

Parking brakes with which motor vehicles are conventionally equipped are "hand" brakes which comprise a lever connected by a cable to a mechanism for applying two of the brakes of the vehicle.

In order to apply such a parking brake, the driver of a vehicle pulls on the control lever and more or less feels a brake-application force from the resistance to movement of the lever, particularly towards the end of its travel. If the vehicle is parked on a slope and begins to move, that encourages the driver to pull more firmly on the lever in order to apply the brakes more firmly and immobilize the vehicle. It is always incumbent upon the driver of the vehicle to apply the parking brake and to do so correctly.

Certain models of vehicle are currently equipped with automatic parking brakes comprising driven means for applying two of the brakes of the vehicle, these means being operated for example by an electric contactor. Actuation of this contactor on the part of the driver causes two of the brakes of the vehicle to be applied, one on the right and one on the left. If, for any reason, one of these brakes is not correctly applied, the driver has no direct or indirect way of knowing this unless the vehicle is parked on a slope and begins to move. It is therefore necessary to provide a means for monitoring the correct application of motor vehicle automatic parking brakes.

To do this, one conceivable way is to fit strain gauges into a vehicle brake in order to check that this brake has been applied correctly on the strength of the signals supplied by the strain gauges. However, such a solution would be too expensive because of the relatively high cost of strain gauges.

SUMMARY OF THE INVENTION

It is a particular object of the invention to afford a simple, satisfactory and economical solution to the problem of monitoring the application of these parking brakes.

To this end, the invention provides a device for monitoring the application of a motor vehicle automatic parking brake, this parking brake comprising driven means of applying at least one brake pad to a brake disk of a wheel of the vehicle, the device being characterized in that it comprises measurement means for measuring a physical property of the pad, the value of which varies as a function of the force with which the pad is applied to the brake disk.

The invention has the advantage of using a property of the brake pad to check whether the brake-application force of the corresponding brake is sufficient, this being a simple and economical embodiment of the monitoring device.

Advantageously, this device comprises comparison means for comparing the measured values of said property with values prerecorded in memory, these comparison means being connected to means for commanding the application of the parking brake. That allows this brake to be reapplied automatically if need be.

In a first embodiment of the invention, this physical property is an electrical magnitude associated with the electrical conductivity of the pad, and in particular of the friction lining of this pad.

All that is then needed is an electrical power supply and a measurement apparatus of the volt meter type for example, these being connected to the brake pad by electrical conductors in order to measure the conductivity of the friction lining.

In one particular form of the invention, the friction lining of the brake pad is made of a conventional material to which an electrically conducting component, such as copper or carbon black for example, has been added, this component being distributed or incorporated within the material of the friction lining in such a way that the conductivity or electrical resistivity thereof varies as a function of the brake-application force applied to it.

In a variant embodiment of the invention, the brake pad comprises a wear indicator which is formed of an electrically conducting element embedded in the friction lining and connected by an electrical conductor to a circuit powering a light indicator when the wear indicator comes into contact with the brake disk, as a result of friction lining wear.

In this case, the invention anticipates adding an electrically conducting component to the material of the friction lining, solely in that part of this lining which lies between the wear indicator and the metal backing to which the lining is attached.

This variant embodiment has the advantage that the physical magnitude measured when the friction lining is being applied is independent of the extent to which this lining is worn.

In another embodiment of the invention, the measured physical property of the brake pad is an acoustic magnitude, such as the acoustic impedance of the brake pad or of its friction lining.

In this case, an emitter/receiver of an appropriate acoustic wave is associated with the brake pad or with the friction lining and the variations in the output signal of the receiver are measured in order to determine and verify the corresponding brake-application force.

The invention also provides a method for monitoring the application of a motor vehicle automatic parking brake, this parking brake comprising driven means of applying at least one brake pad to a brake disk of a wheel of the vehicle, characterized in that it essentially consists, following a command to apply the parking brake, in measuring a physical property of the brake pad, this property varying as a function of the force with which this pad is applied, in comparing the measurement with a prerecorded value and, if the measurement is below the prerecorded value, in once again commanding the application of the parking brake and/or in emitting a signal for the attention of the driver of the vehicle.

For preference, the method according to the invention consists in measuring said physical property of the pad at different instants following a command to apply the parking brake, in comparing the measured values with corresponding prerecorded values and in once again commanding the application of the parking brake if at least one of the measurements or the variation in the value between the measurements is below the corresponding prerecorded value.

It is thus possible, in particular, to measure an initial value of the physical property of the brake pad, at the instant that a command to apply the automatic parking brake is given by the driver of the vehicle, then to measure this property when the brakes are applied by the driven means, and to measure this property once again after the brakes have been mechanically locked and the driven means have returned to their position of rest.

Doing this makes it possible to take account of mechanical relaxation of the brakes when the driven brake-application means are no longer activated and to check that the parking brake is still correctly applied following this mechanical relaxation. Advantageously, it is also possible once again to measure the physical property of the brake pad a certain time following the application of the parking brake, in order to allow the brakes to cool and return to a normal or near-normal temperature.

That in particular allows the automatic parking brake to be reapplied if necessary, when it has been commanded by the driver of the vehicle following intensive braking that has caused the vehicle brakes to heat up significantly and experience corresponding thermal expansion.

The invention will be better understood and other features, details and advantages thereof will become more clearly apparent from reading the description which follows, given by way of example with reference to the attached drawings.

DETAILED DESCRIPTION OF THE INVENTION

Figure 1:
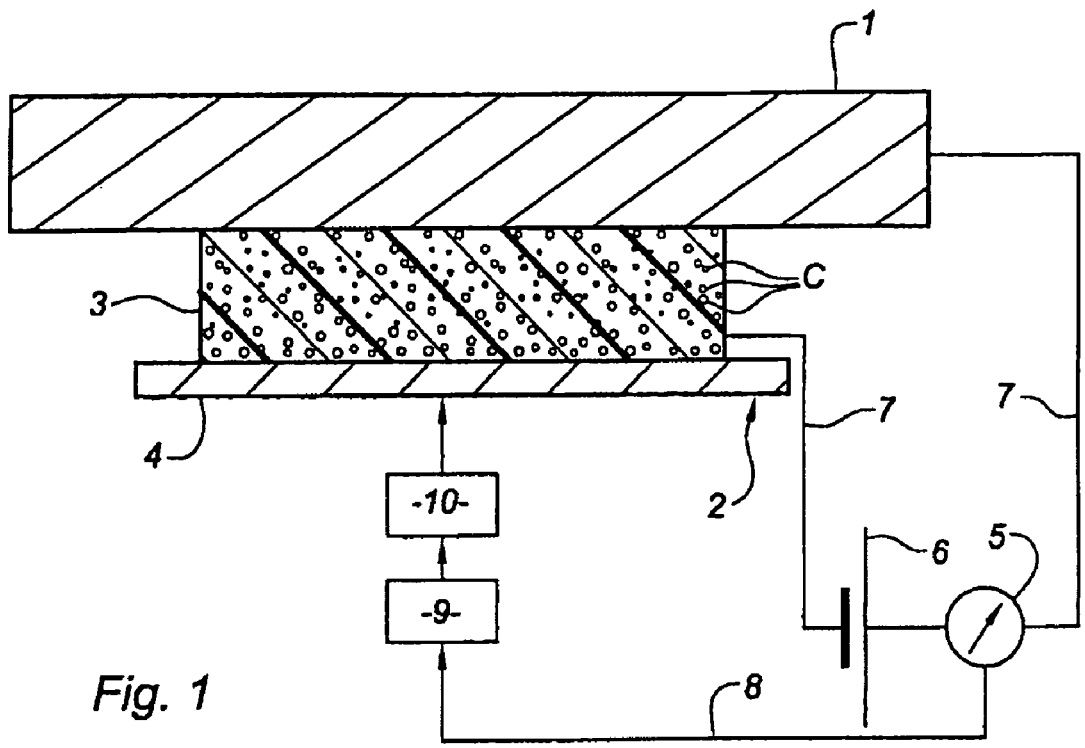
FIG. 1 schematically depicts an exemplary embodiment of a monitoring device according to the invention, equipping a motor vehicle disk brake.

In FIG. 1, the reference 1 denotes a brake disk secured to a wheel (not depicted) of a motor vehicle and which is intended to be clamped between two brake pads 2 (just one of which is depicted in FIG. 1) which are urged against the opposite faces of the disk 1 by a hydraulic brake in a set-up of a known type.

Each brake pad 2 comprises a lining 3 made of a friction material and attached, for example by bonding, to a metal backing 4.

According to the invention, this friction material also comprises an electrically conducting component C for example in powdered or granular form, for example copper or carbon black, or granules of insulating elements coated with a conductive coat which is distributed through the friction lining 3 in such a way that the resistivity or electrical conductivity thereof varies appreciably as a function of the compression force applied to it when the corresponding brake is applied. This distribution is advantageously uniform.

This conductivity or electrical resistivity may be measured by means of the device depicted in FIG. 1 which essentially comprises a measurement apparatus 5 of the volt meter type for example, and an electrical power supply circuit 6 which may consist of the electric battery of the motor vehicle or of a specific supply circuit powered from the vehicle's battery.

The measurement apparatus 5 and the power supply circuit 6 are connected to one another, to the friction lining 3 of the brake pad and to the brake disk 1 by electrical conductors 7 as depicted in order to form a closed circuit so that the measurement signal supplied by the apparatus 5 varies with the conductivity or electrical resistivity of the friction lining 3, which itself varies with the force with which the linings of the brake pads are applied to the disk 1. Typically, the resistivity decreases with the compression.

The output signal from the apparatus 5 is applied to one input of means 9, advantageously digital means, comprising values prerecorded in memory and means for comparing the signal 8 with these prerecorded values.

The output from the means 9 is connected to means 10 for commanding the application of the parking brake.

As a variant, the assembly formed by the measurement apparatus 5 and the power supply circuit 6 may be connected, not to the brake disk 1 as depicted, but to the electrical ground of the vehicle.

Figure 2:
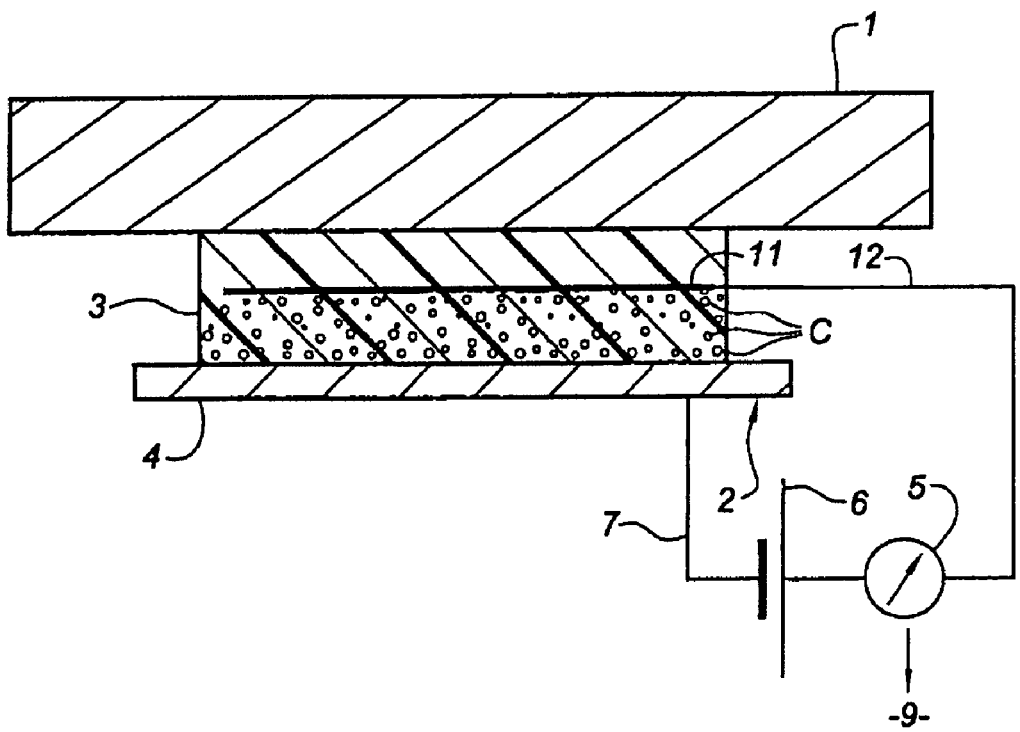
FIG. 2 schematically depicts a variant embodiment of this device.

FIG. 2 depicts a variant embodiment of the invention in which the lining 3 of the brake pad 2 is equipped with a wear indicator 11, formed of an electrical conductor embedded in the material of the friction lining 3 and intended to come into contact with the brake disk 1 when the extent to which the friction lining 3 is worn reaches a predetermined value, for example equal to one fifth of the thickness of the lining. This wear indicator 11 is connected to an electrical conductor 12 external to the friction lining 3, this conductor 12 itself being connected to signaling means generally comprising a light indicator which, when lit up, informs the driver of the vehicle that the brake pads need to be replaced.

According to the invention, only that part of the friction lining 3 that lies between the metal backing 4 and the wear indicator 11 contains an electrically conducting material C in granular or powder form which means that it is the conductivity or electrical resistivity of this part of the lining 3 that will be measured when monitoring the application of the brake.

To do this, the monitoring device according to the invention comprising the measurement apparatus 5 and the electrical power supply circuit 6 which have already been described is connected by an electrical conductor 7 to the metal backing 4 of the brake pad and to the metal conductor 12 of the wear indicator 11.

As in the embodiment of FIG. 1, the output of the measurement apparatus 5 is connected to the means 9 for comparing the measured values with prerecorded values. As an alternative, the electrical impedance of the lining is measured at one or more frequencies of an AC current and/or at high frequency.

The way in which the device according to the invention works will now be described with reference to FIG. 3.

This figure is a graph representing the curve of the variation, as a function of time t, of the force applied to the friction lining 3 when applying the parking brake.

This curve comprises a first part 20 representing gradual application of the brake, between the instant t0 of actuation of the parking brake command by the driver of the vehicle and the instant t1 where the brake-application force reaches a maximum value. This first part 20 of the curve is followed by a second part 21 which is a steady state corresponding to the maintaining of the maximal application force between the instants t1 and t2, the instant t2 corresponding to the end of the application of the brake-application force exerted by the hydraulic braking circuit once the brake has been mechanically locked in the brakes-applied position.

The time interval t1-t2 may be relatively short, for example of the order of one second.

The second part of the curve is followed by a third part 22 between the instants t2 and t3 which corresponds to mechanical relaxation of the brake, the force F experienced by the lining 3 decreasing slightly between a value corresponding to the force of application by the hydraulic brake and a value corresponding to the force of application maintained by the mechanical locking of the brake in the brakes-applied position.

The third part 22 of the curve is followed by a fourth part 23 which corresponds to possible thermal relaxation of the brake and which may be more or less pronounced according to the temperature of the brake when the command to apply the automatic parking brake was received. This fourth part 23 of the curve between the instants t3 and t4 therefore corresponds to the return of the brake to a normal temperature, the brake-application force at the instant t4 being less than the brake-application force at the instant t3 because of the cooling-instigated contraction of the brake components. The fifth part 24 of the curve after the instant t4 is a steady state where the value of the force F is constant.

Figure 3:
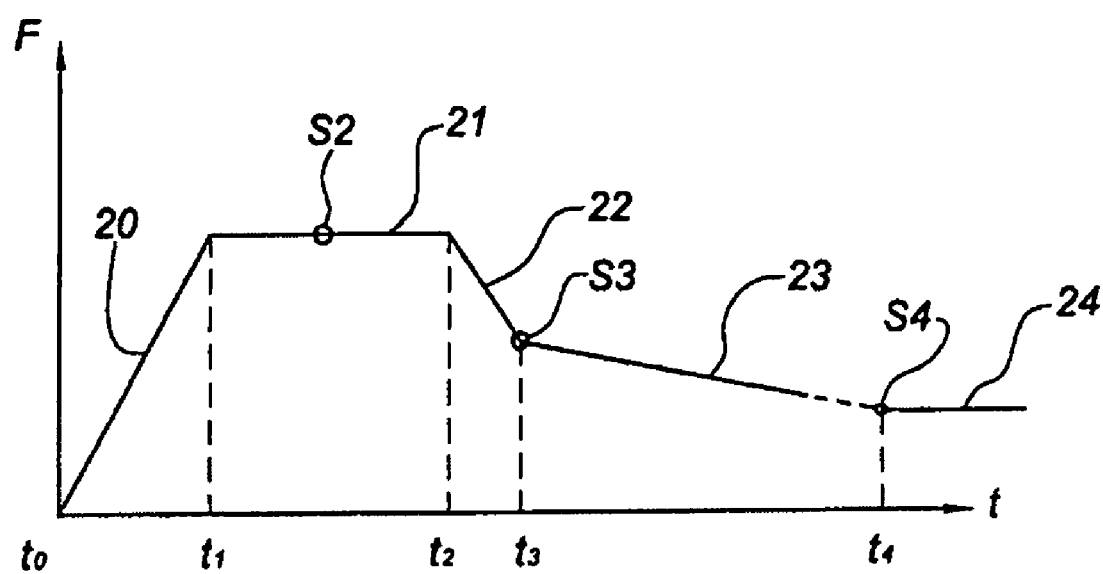
FIG. 3 is a graph representing the variation in force experienced by a brake pad as a function of time upon actuation of an automatic parking brake.

The device according to the invention is then calibrated by recording values S1, S2, S3 and S4 for the output signal of the measurement apparatus 5 which correspond to the various parts of the curve depicted in FIG. 3, in the case of correct application of the automatic parking brake. The value S1 is an initial value measured at the instant t0 when application of the automatic parking brake is commanded, the value S2 is recorded between the instants t1 and t2, the value S3 is recorded at the instant t3 at the end of mechanical relaxation of the brake and the value S4 is recorded at the instant t4 during or after cooling of the brake (for example 30 minutes after the command to apply the parking brake).

Thereafter, monitoring correct application of the automatic parking brake consists in comparing the output signal from the measurement apparatus 5 with the recorded value S1 at the instant t0, then with the recorded value S2, at an instant between t1 and t2, then with the recorded value S3, at an instant corresponding to the instant t3 and finally with the recorded value S4 at an instant corresponding to the instant t4 (if no command to release the automatic parking brake has been issued by the driver of the vehicle in the meantime).

If one of the values of the output signal from the measurement apparatus 5 is significantly below the recorded values S2, S3 and S4, that is to say if the discrepancy between the output signal from the apparatus 5 and these recorded values exceeds a predetermined value, it is possible from this to deduce that the automatic parking brake has not been applied sufficiently firmly and the means 9 once again command the application of this parking brake. At the same time, a signal may be emitted for the attention of the driver of the vehicle. The further command to apply the parking brake makes it possible, for example, for this brake to be reapplied if the reduction in the braking force during the cooling interval t3-t4 has been relatively high.

Instead of comparing the values of the output signal from the apparatus 5 with the prerecorded values, it is possible beforehand to calculate differences and/or ratios between these measurements and to compare these with similar differences and/or ratios in the prerecorded values, in order to circumvent the influence of certain parameters, such as ambient temperature or pad wear.

In the preferred embodiment, the values S2-S1, S2-S3, S2-S4, S3-S4 and/or S3-S1 are compared with the predetermined corresponding values in order to determine whether the pads 2 have been correctly applied to the disk 1. If the difference S3-S4 exceeds a predetermined threshold it is considered that unacceptable thermal relaxation (or roll away) is present and the braking circuit computer reapplies the parking brake for example by switching on a high-pressure pump of the braking system ESP hydraulic unit.

In a variant embodiment of the invention, another physical property of the brake pad and/or of its friction lining is measured, for example its acoustic impedance, using a sensor that advantageously forms an emitter and a receiver, such as an ultrasound sensor for example.

The invention claimed is:

1. A method for monitoring the application of a motor vehicle automatic parking brake by driven means by sensing the compression of at least one brake pad (2) on engagement with a brake disk (1) through a first actuation force to prevent rotation of a wheel on a vehicle associated with the brake disk following a command to apply the automatic parking brake including the following steps: measuring the compression of the brake pad that varies as a function of the force applied to the brake disk in response to the first actuation force; comparing the measured compression with a prerecorded value; and commanding the application of an additional second actuation force to the parking brake if the measured compression is below the prerecorded value to prevent the rotation of the wheel as a result of relaxation of the disk brake after a first period of time and activating a signal for the attention of the driver of the vehicle whenever the measurement is below the prerecorded value.

2. The method according to claim 1, characterized by a further step of measuring said compression as the brake cools.

3. The method according to claim 1, further including the step of: comparing differences and/or ratios of the measured values of said compression with differences and/or ratios of the corresponding prerecorded values.

4. The method according to claim 1 further including the step of: measuring an electrical magnitude associated with the conductivity or electrical resistivity of a portion of the brake pad (2).

5. The method according to claim 1, characterized by the step of: measuring the compression of the brake pad (2) occurs at different instants following a command to apply the parking brake such that the parking brake has sufficient time to relax.

6. The method according to claim 1, characterized by the steps of: measuring a first value of the compression of the pad before the parking brake is applied, measuring a second value of the compression while the brake is being applied by the driven application means; and measuring a third value of the compression mechanical locking of the wheel and return of the application means to a position of rest.

* * * * *